United States Patent
Yamamoto et al.

(10) Patent No.: US 9,671,778 B2
(45) Date of Patent: Jun. 6, 2017

(54) PROCESS CONTROL SYSTEM AND MANAGING METHOD THEREFOR

(71) Applicant: Yokogawa Electric Corporation, Musashino-shi, Tokyo (JP)

(72) Inventors: Mitsuhiro Yamamoto, Musashino (JP); Kimikazu Takahashi, Musashino (JP); Hiroyuki Takizawa, Musashino (JP); Ryuu-ichirou Hoshina, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 703 days.

(21) Appl. No.: 14/049,451

(22) Filed: Oct. 9, 2013

(65) Prior Publication Data
US 2014/0107808 A1 Apr. 17, 2014

(30) Foreign Application Priority Data
Oct. 15, 2012 (JP) ................. 2012-227845

(51) Int. Cl.
*G05B 15/02* (2006.01)
*G05B 19/418* (2006.01)

(52) U.S. Cl.
CPC ......... *G05B 19/4185* (2013.01); *G05B 2219/31088* (2013.01); *G05B 2219/31118* (2013.01); *G05B 2219/31238* (2013.01); *Y02P 90/14* (2015.11); *Y02P 90/18* (2015.11)

(58) Field of Classification Search
CPC ....... G05B 19/4185; Y02P 90/14; Y02P 90/18
USPC .......................................... 700/9
See application file for complete search history.

(56) References Cited

U.S. PATENT DOCUMENTS

| | | | | |
|---|---|---|---|---|
| 7,519,701 B1 * | 4/2009 | Bogner | ............... | H04L 43/0817 709/223 |
| 2004/0010627 A1 * | 1/2004 | Ellis | .................... | H04L 12/2697 709/250 |
| 2006/0268680 A1 * | 11/2006 | Roberts | ............... | H04L 41/0663 370/216 |
| 2007/0156265 A1 * | 7/2007 | McCoy | .............. | G05B 19/0426 700/83 |
| 2008/0046766 A1 * | 2/2008 | Chieu | .................... | G06F 1/206 713/300 |

(Continued)

FOREIGN PATENT DOCUMENTS

| | | |
|---|---|---|
| EP | 2492771 A2 | 8/2012 |
| GB | 2477443 A | 8/2011 |
| JP | 9-244741 A | 9/1997 |

(Continued)

*Primary Examiner* — Kenneth M Lo
*Assistant Examiner* — Yuhui R Pan
(74) *Attorney, Agent, or Firm* — Westerman, Hattori, Daniels & Adrian, LLP

(57) ABSTRACT

A process control system for controlling an industrial process implemented at a plant, may include: a network provided in the plant; a network device comprising at least one of a first detector, which is configured to detect a connection state of the network device with the network, and a second detector, which is configured to detect a state of the network device, the network device being configured to output at least one of connection information, which indicates a first detection result detected by the first detector, and device state information, which indicates a second detection result detected by the second detector, to the network.

5 Claims, 8 Drawing Sheets

(56) References Cited

U.S. PATENT DOCUMENTS

2008/0189456 A1* 8/2008 Schmidt ............. G06F 13/4295
710/106
2009/0083204 A1* 3/2009 Baier ................. G06F 11/3013
706/45

FOREIGN PATENT DOCUMENTS

| JP | 2007-199796 A | 8/2007 |
| JP | 4326768 B2 | 9/2009 |
| JP | 2012-174120 A | 9/2012 |

* cited by examiner

PROCESS CONTROL SYSTEM AND MANAGING METHOD THEREFOR

BACKGROUND OF THE INVENTION

Field of the Invention

The present invention relates to a process control system constructed at a plant, a factory, or the like, and a managing method therefor.

Priority is claimed on Japanese Patent Application No. 2012-227845, filed Oct. 15, 2012, the content of which is incorporated herein by reference.

Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

Conventionally, a process control system is constructed at a plant, a factory, and the like (hereinafter referred to collectively as 'plant') and controls various kinds of state quantities in the industrial process (e.g. pressure, temperature, flow rate, etc.), thereby achieving a high degree of automation. The process control system includes on-site devices known as field devices (measuring devices and operating devices), controllers for controlling the operation of these field devices, and a higher-level managing apparatus that manages and controls the field devices and the controllers, which are connected via a communications means.

In such a process control system, process values acquired by the field devices (e.g. measurements of pressure, temperature, flow rate, etc.) are collected by the controllers, and, under the management of the upper managing apparatus, the various state quantities are controlled by operating the field devices in accordance with the process values collected by the controllers. Information indicating the states of the controllers and the like are collected by the upper managing apparatus, and the process control system is managed on the basis of this collected information.

Hitherto, in most process control systems, a controller and field devices with analog communication functions were connected via analog transmission lines (e.g. transmission lines used for transmitting signals of 4 to 20 mA). In contrast, in many recent process control systems, to achieve high functionality, digitized field devices and a controller are connected by a wired or wireless network (e.g. a field network).

Japanese Patent (Granted) Publication No. 4326768 discloses a technology for diagnosing the soundness of a plant network installed at a power plant or the like. Specifically, in a technology disclosed in Japanese Patent (Granted) Publication No. 4326768, the soundness of the plant network is diagnosed by connecting a data collection means and a test means to a plant network which is connected to a control device, collecting all frames transmitted on the plant network in the data collection means, and testing the frames in the test means by comparing frames transmitted in a regular cycle with frame reference information stored beforehand.

In the conventional process control system described above, since the field devices and the controllers are basically connected one-to-one via analog transmission lines, the connection between the field devices and the controllers is simple. Therefore, if the process control system fails in some way (e.g. if there is a communication failure between a field device and a controller), it is easy to identify the location of the failure.

In contrast, in the recent process control system described above, the field devices and the controller are connected via a network. This network is configured from, for example, a plurality of network switches connected in a cascade, and, since the scale of the network increases according to the number of field devices and controllers, the connection of the field devices and controllers is more complex than in the conventional systems. Devices supplied from various vendors (field devices, controllers, etc.) can also be connected to this network.

When a network of connected field devices and controllers becomes complex and devices supplied from various vendors are connected to it in this way, it is difficult to manage the overall process control system including the network and the devices constituting the process control system. This leads to a problem that, when there is a failure in the network or in a device constituting the process control system, there is a danger that the failure will go undetected and control will be performed based on erroneous process values.

Even if a failure in the network or in a device constituting the process control system is detected, there is a problem that it is difficult to identify the location and cause of the failure, for the following reasons:

(1) Non-Uniformity of Information Coding Systems

Due to multi-vending of devices and the like, the coding system for information indicating the states of the devices constituting the process control system may differ for each type of device. Consequently, even if the same failure is detected in different types of devices, since the information codes indicating the failure are different, a dictionary or the like is needed to decipher them. Conventionally, a higher device carries out this deciphering process using a dictionary or the like, and since every change or expansion of the codes requires a change/addition to the dictionary and the like, there are considerable obstacles to easily ascertaining the type of the failure.

(2) Insufficient Route Information

Conventionally, many of the devices that constitute a network (e.g. network switches, gateways, linking devices, etc.) cannot transmit their route information and state. Moreover, even if the devices include this function, when there are restrictions due to the outdated architecture of the process control system and such like, it is not possible to acquire sufficient route information of the network and this function cannot be adequately utilized, or this function is not easy to utilize and there are difficulties in correctly identifying failures that occur in the network.

SUMMARY

The present invention provides a process control system and managing method therefor that can easily identify the location and cause of failures.

A process control system for controlling an industrial process implemented at a plant, may include: a network provided in the plant; a network device comprising at least one of a first detector, which is configured to detect a connection state of the network device with the network, and a second detector, which is configured to detect a state of the network device, the network device being configured to output at least one of connection information, which indicates a first detection result detected by the first detector, and device state information, which indicates a second detection result detected by the second detector, to the network.

The network may include a plurality of layers including other network devices. The first detector of the network device is configured to detect the connection state of the network device with the other network devices in an adjacent higher-level layer and an adjacent lower-level layer.

The network device may be configured to receive at least one of the connection information and the device state information from one of the other network devices in one of the adjacent higher-level layer and the adjacent lower-level layer. The network device may be configured to output the at least one of the connection information and the device state information, which has been received, together with at least one of the connection information, which has been acquired as the detection result detected by the first detector, and the device state information, which has been acquired as the detection result detected by the second detector, to one of the other network devices in one of the adjacent higher-level layer and the adjacent lower-level layer.

The network device may further include a normalization unit configured to convert the connection information and the device state information to a predetermined format.

The process control system may further include: a higher-level managing apparatus configured to collect the connection information and the device state information from the network device so as to manage the network.

The network device may be configured to transmit to the higher-level managing apparatus information having a frame including a header region, an information storage region, and a footer region. The information storage region may be configured to store information relating to a lower-level layer network device provided in a lower-level layer of the network, information relating to the network device, and information relating to a higher-level layer network device provided in a higher-level layer of the network.

The first detector may be configured to detect both a physical connection state and a logical connection state of the network device with the other network devices in the adjacent higher-level layer and the adjacent lower-level layer.

A network device included in a network provided in a plant and comprising a plurality of layers connected in layers and including other network devices, may include: a higher-level layer connection detector configured to detect a connection state between the network device and a higher-level layer network device, which is provided in a higher-level layer of the network and directly connected the network device, so as to output connection information indicating a detection result to a normalization unit; a lower-level layer connection detector configured to detect the connection state between the network device and a lower-level layer network device, which is provided in a lower-level layer of the network and directly connected the network device, so as to output the connection information indicating the detection result to the normalization unit; a device state detector configured to detect a state of the network device so as to output device state information indicating the detection result to the normalization unit; a lower-level layer information collection unit configured to collect at least one of the connection information and the device state information output from the lower-level layer network device so as to output to the normalization unit; the normalization unit configured to convert the connection information from the higher-level layer connecting detector and the lower-level layer connecting detector, the device state information from the device state detector, and at least one of the connection information and the device state information from the lower-level layer information collection unit to a predetermined format; and a communication unit configured to communicate with the higher-level layer network device and with the lower-level layer network device.

The network device may further include: a determination unit including a memory configured to store the connection information and the device state information output from the normalization unit, the determination unit being configured to compare the connection information and the device state information, which have been previously output from the normalization unit and stored beforehand in the memory, with the connection information and the device state information, which are newly output from the normalization unit, so as to determine whether or not a content of the connection information and the device state information has changed.

The communication unit may be configured to transmit via the network toward a higher-level managing apparatus information having a frame including a header region, an information storage region, and a footer region. The information storage region may be configured to store information relating to the lower-level layer network device, information relating to the network device, and information relating to the higher-level layer network device.

The connection information may include both a physical connection state and a logical connection state.

A managing method for a process control system for controlling an industrial process implemented at a plant, may include: detecting at least one of a connection state of a network device, which is connected to a network provided at the plant or forming one part of the network, with the network, and the state of the network device; outputting at least one of connection information indicating a detection result of the connection state with the network, and device state information indicating a detection result of the state of the network device; and collecting the connection information and the device state information which has been output so as to manage the network.

The network may include a plurality of layers including other network devices. The managing method may further include: detecting the connection state of the network device with the other network devices in an adjacent higher-level layer and an adjacent lower-level layer.

The managing method may further include: receiving at least one of the connection information and the device state information from one of the other network devices in one of the adjacent higher-level layer and the adjacent lower-level layer, and outputting at least one of the connection information and the device state information, which has been received, together with at least one of the connection information, which has been acquired as the detection result, and the device state information, which has been acquired as the detection result, to one of the other network devices in one of the adjacent higher-level layer and the adjacent lower-level layer.

The managing method may further include: converting the connection information and the device state information to a predetermined format.

The managing method may further include: collecting the connection information and the device state information from the network device so as to manage the network.

The managing method may further include: transmitting to a higher-level managing apparatus information having a frame including a header region, an information storage region, in which information relating to a lower-level layer network device provided in a lower-level layer of the network, information relating to the network device, and information relating to a higher-level layer network device provided in a higher-level layer of the network are stored, and a footer region.

The managing method may further include: detecting both a physical connection state and a logical connection state of the network device with the other network devices in the adjacent higher-level layer and the adjacent lower-level layer.

The managing method may further include: storing in a memory the connection information and the device state information that have been output; and comparing the connection information and the device state information, which have been previously output and stored beforehand in the memory, with the connection information and the device state information, which are newly output, so as to determine whether or not a content of the connection information and the device state information has changed; and outputting the connection information and the device state information, which are newly output, if determined that the content has changed.

According to a preferred embodiment of the present invention, a network device, connected to a network or forming one part of the network, detects at least one of the connection state with the network and the state of the network device itself, and outputs at least one of connection information indicating the determination result of the connection state with the network, and device state information indicating the determination result of the state of the network device itself, to the network. The present invention therefore has an advantageous effect of enabling the locations and causes of failures to be identified easily.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

A process control system and a managing method therefor according to preferred embodiments of the present invention will be described with reference to the accompanying drawings.

First Preferred Embodiment

Figure 1:
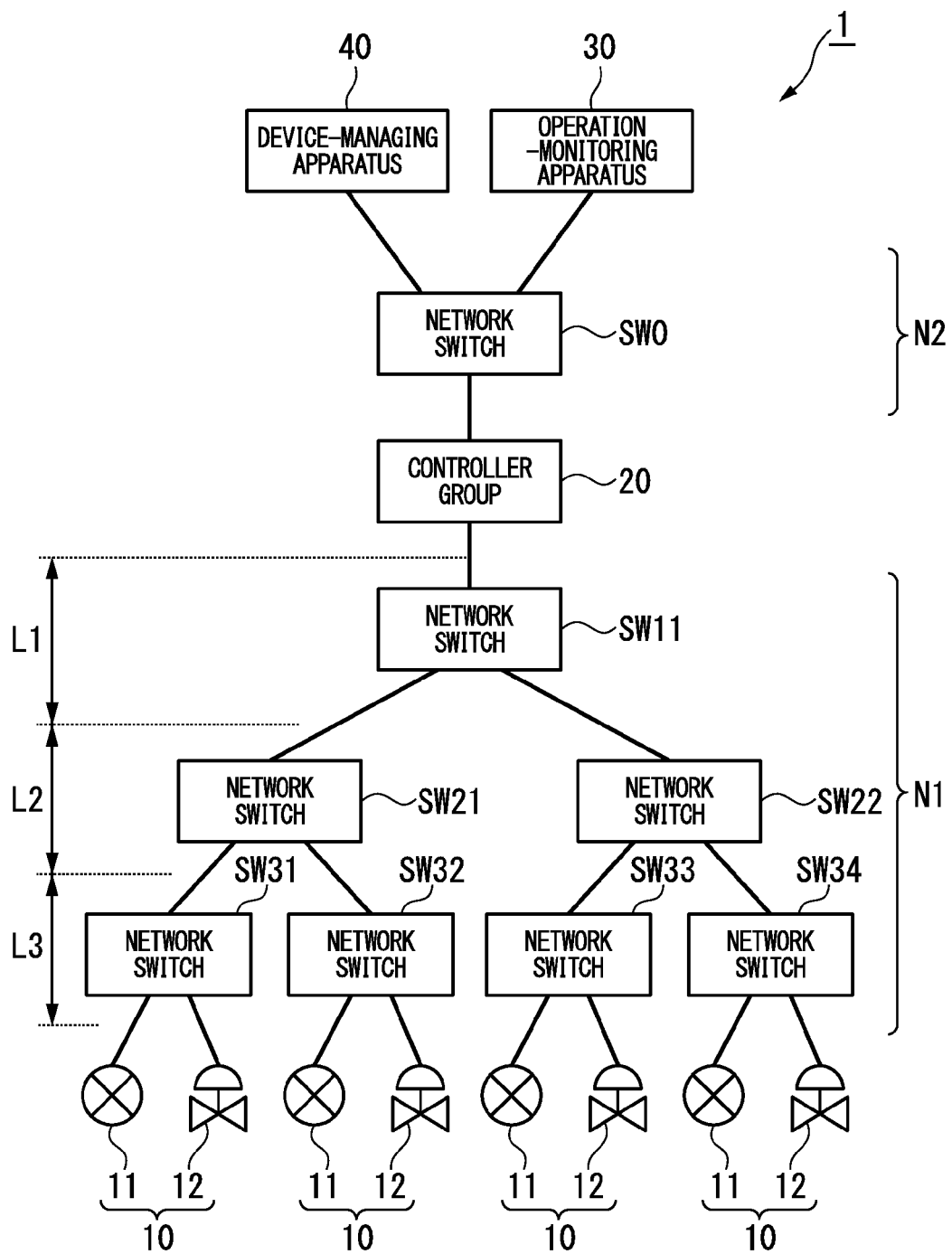
FIG. 1 is a block diagram of the overall configuration of a process control system in accordance with a first preferred embodiment of the present invention.

FIG. 1 is a block diagram of the overall configuration of a process control system in accordance with a first preferred embodiment of the present invention. As shown in FIG. 1, a process control system 1 of the first preferred embodiment includes a field network N1 (network), a control network N2 (network), a plurality of field devices 10 (network devices), a controller group 20 (network devices), an operation-monitoring apparatus 30, and a device-managing apparatus 40 (upper managing apparatus). In the process control system 1 having this configuration, the controller group 20 controls the plurality of field devices 10 under the supervision of the operation-monitoring apparatus 30, and industrial processes implemented at a plant (not shown) are thereby controlled.

The field network N1 is a network installed at, for example, a plant site, and is configured by connecting a plurality of network switches SW11, SW21, SW22, and SW31 to SW34 (network devices) in a tree-type cascade. In the field network N1, the network switch SW11 is provided in a highermost first layer L1, the network switches SW21 and S22 are provided in an intermediate second layer L2, and the network switches SW31 to S34 are provided in a bottommost third layer L3, so that the network switches provided in these layers constitute what can be called a network connected in layers.

The control network N2 connects, for example, a plant site to a monitoring room, and is configured from a network switch SW0 (network device). The field network N1 and the control network N2 can be wired networks or wireless networks, or they can be a mixture of wired and wireless networks. The network switches SW11, SW21, SW22, and SW31 to SW34 forming the field network N1 and the network switch SW0 forming the control network N2 will be described in detail later.

The field devices 10 are, for example, sensors such as flow meters and temperature sensors, valve devices such as flow control valves and on-off valves, actuator devices such as fans and motors, or other devices installed at the plant site, and they are connected to the field network N1. In FIG. 1, to facilitate understanding, of the field devices 10 installed at the plant, only sensor devices 11 for measuring the flow rate of a fluid and valve devices 12 for controlling (manipulating) the flow rate of the fluid are shown. To simplify the explanation, a pair including one sensor device 11 and one valve device 12 is connected to each of the network switches SW31 to SW34 forming the field network N1.

The controller group 20 includes at least one controller that controls a state quantity (e.g. fluid flow rate) in an industrial process under the supervision of the operation-monitoring apparatus 30, and is connected to the field network N1 and the control network N2. Specifically, the controller group 20 collects measurement data from the sensor devices 11 under the supervision of the operation-monitoring apparatus 30, determines the control values of the valve devices 12 from the measurement data that it collected, and thereby controls the valve devices 12. The controller group 20 also transmits various types of information acquired via the field network N1 (information needed in managing the process control system 1) to the device-managing apparatus 40.

The operation-monitoring apparatus 30 is connected to the control network N2, and monitors and controls the field devices 10 and the controller group 20 connected to the field network N1. Specifically, the operation-monitoring apparatus 30 sends and receives various kinds of parameters to and from the controller group 20 via the control network N2, and monitors the field devices 10. For example, it acquires parameters set in the field devices 10 from the controller group 20 and ascertains the present measurement conditions; in addition, it changes the measurement conditions by making the controller group 20 set new parameters in the field devices 10.

The operation-monitoring apparatus 30 includes an input apparatus such as a keyboard and a pointing device, and a display apparatus such as a liquid crystal display. It displays the monitoring results of the field devices 10 and the controller group 20 on the display apparatus and thereby supplies information indicating the state of the plant to an operator (plant operator) or the like; in addition, it controls the controller group 20 in accordance with commands input by the operator or the like who operates the input apparatus.

The device-managing apparatus 40 is connected to the control network N2 and collects various kinds of information sent to it via the control network N2, or various kinds of information sent to it via the field network N1 and the control network N2, and manages the process control system 1 (specifically, the field devices 10, the controller group 20, the field network N1, and the control network N2). The device-managing apparatus 40 includes a display apparatus such as a liquid crystal display, and supplies information collected via the control network N2 and the like to the operator or the like by displaying it on the display apparatus when required.

Figure 2:
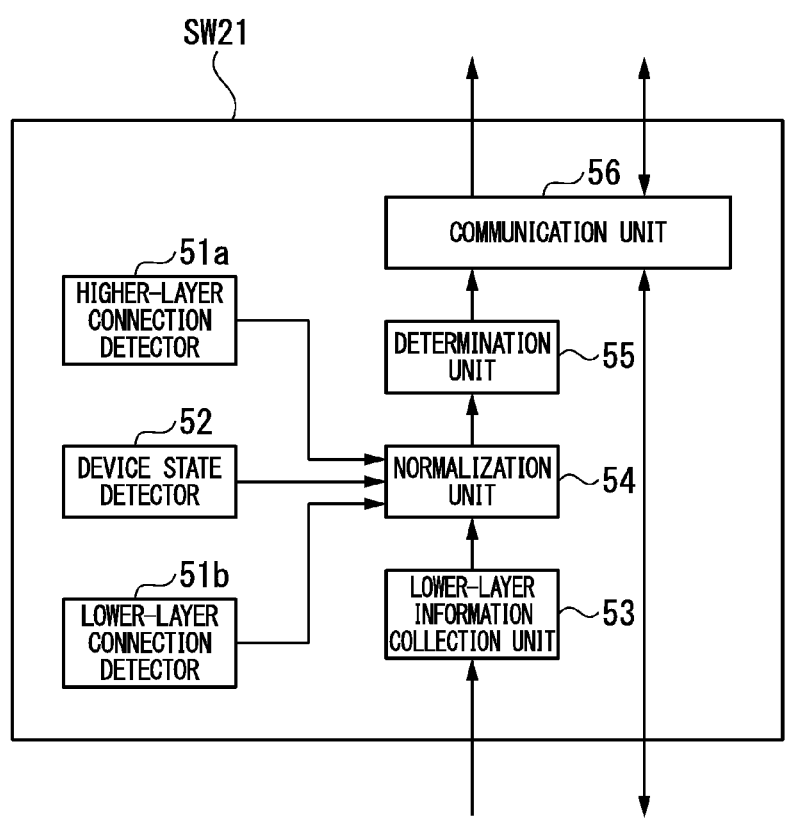
FIG. 2 is a block diagram of the configuration of primary parts of a network switch provided in a process control system in accordance with the first preferred embodiment of the present invention.

Subsequently, the network switches SW11, SW21, SW22, and SW31 to SW34 forming the field network N1, and the network switch SW0 forming the control network N2 will be described in detail. FIG. 2 is a block diagram of the configuration of primary parts of a network switch provided in a process control system in accordance with the first preferred embodiment of the present invention. In the following explanation, since the network switches SW0, SW11, SW21, SW22, and SW31 to SW34 have similar configurations, the network switch SW21 forming one part of the field network N1 will be taken as representative.

As shown in FIG. 2, the network switch SW21 includes a higher-level layer connecting detector 51a (first detector), a lower-level layer connecting detector 51b (first detector), a device state detector 52 (second detector), a lower-level layer information collection unit 53, a normalization unit 54, a determination unit 55, and a communication unit 56. The network switch SW21 is provided in the second layer L2 of the field network N1 shown in FIG. 1, and is connected (connected) to the network switch SW11 provided in the first layer L1 and the network switches SW31 and SW32, provided in the third layer L3.

The higher-level layer connecting detector 51a is arranged in the higher-level layer, and detects a connected state between the network switch itself (network switch SW21) and a network switch that is directly connected thereto (network switch SW11); the higher-level layer connecting detector 51a then outputs connection information indicating the detection result to the normalization unit 54. Similarly, the lower-level layer connecting detector 51b is arranged in the lower-level layer, and detects a connected state between the network switch itself (network switch SW21) and directly connected network switches (network switches SW31 and SW32); the lower-level layer connecting detector 51b then outputs connection information indicating the detection result to the normalization unit 54.

Specifically, the higher-level layer connecting detector 51a and the lower-level layer connecting detector 51b detect both a physical connection state and a logical connection state. For example, they detect the connection state with other network switches by diagnosing the following:

whether a cable or a connector has become disconnected;
confirmation of the type of network switch (identifier, model name, etc.);
whether a physical connection (link) has been established;
bit error rate and signal amplitude; and
whether response is normal when diagnostic data has been transmitted.

The device state detector 52 detects the state (internal state, operating state, etc.) of the network switch itself (network switch SW21) and outputs device state information indicating the detection result to the normalization unit 54. For example, it detects the following:

whether there is a malfunction in the components and modules inside the network switch itself;
usage rate of central processing unit (CPU), memory, etc.;
temperature of components inside the network switch itself, temperature of surrounding environment, power voltage; and
self-diagnosis of functions operating inside the network switch itself.

The lower-level layer information collection unit 53 is arranged in the lower-level layer, and collects connection information and device state information output from the network switch itself (network switch SW21) and the directly connected network switches (network switches SW31 and SW32), and outputs to the normalization unit 54. When only one of the connection information and the device state information is output from a network switch in the lower-level layer, the lower-level layer information collection unit 53 collects only that one of the connection information and the device state information.

The normalization unit 54 converts the connection information from the higher-level layer connecting detector 51a and the lower-level layer connecting detector 51b, the device state information from the device state detector 52, and the connection information and the device state information from the lower-level layer information collection unit 53 to a predetermined format. For example, the normalization unit 54 converts the connection information and the device state information such that they match a predetermined reference coding system. This conversion is performed to unify the coding system of the connection information and the device state information, so that they will be handled in the same manner by each device.

The connection information converted by the normalization unit 54 contains, for example, the following information:

the port number of the network switch itself;
the identifiers of network switches directly connected to the network switch itself;

the port numbers of network switches directly connected to the network switch itself; and information indicating the soundness of the connecting.

The device information converted by the normalization unit 54 contains, for example, the following information:

information indicating the state of the network switch itself;

information indicating the time when the state of the network switch itself was detected;

when an abnormality or malfunction has occurred, information indicating the type of the abnormality or the like; and information indicating the component or module where the abnormality or the like was detected.

When some information is missing from the connection information and the device state information collected by the lower-level layer information collection unit 53, the normalization unit 54 can compensate for this missing information by using other connection information and device state information. For example, if the device state information collected by the lower-level layer information collection unit 53 does not contain information indicating the time when the device state information of the network switch SW31 was detected, this can be compensated by using a time acquired by going back by a predetermined time from the time when the device state detector 52 of the network switch SW21 detected its device state information.

The determination unit 55 determines whether the content of the connection information and the device state information output from the normalization unit 54 has changed; if it determines that their content has changed, it outputs the connection information and the device state information. The determination unit 55 is provided to reduce the amount of connection information and device state information. Specifically, the determination unit 55 includes a memory (not shown) for storing the connection information and the device state information output from the normalization unit 54, and determines whether the content of the connection information and the device state information has changed by comparing the connection information and the device state information previously output from the normalization unit 54 and stored beforehand in the memory with connection information and the device state information newly output from the normalization unit 54. When there is no need to reduce the amount of connection information and device state information output in the higher-level layer, the determination unit 55 can be omitted.

The communication unit 56 communicates with the higher-level layer network switch (network switch SW11) that is directly connected to the network switch itself (network switch SW21), and with the lower-level layer network switches (network switches SW31 and SW32) that are directly connected to the network switch itself (network switch SW21), transmitting data from the controller group 20 to the field devices 10 and from the field devices 10 to the controller group 20. The communication unit 56 also transmits connection information and device state information output from the determination unit 55 to the device-managing apparatus 40.

Figure 3:
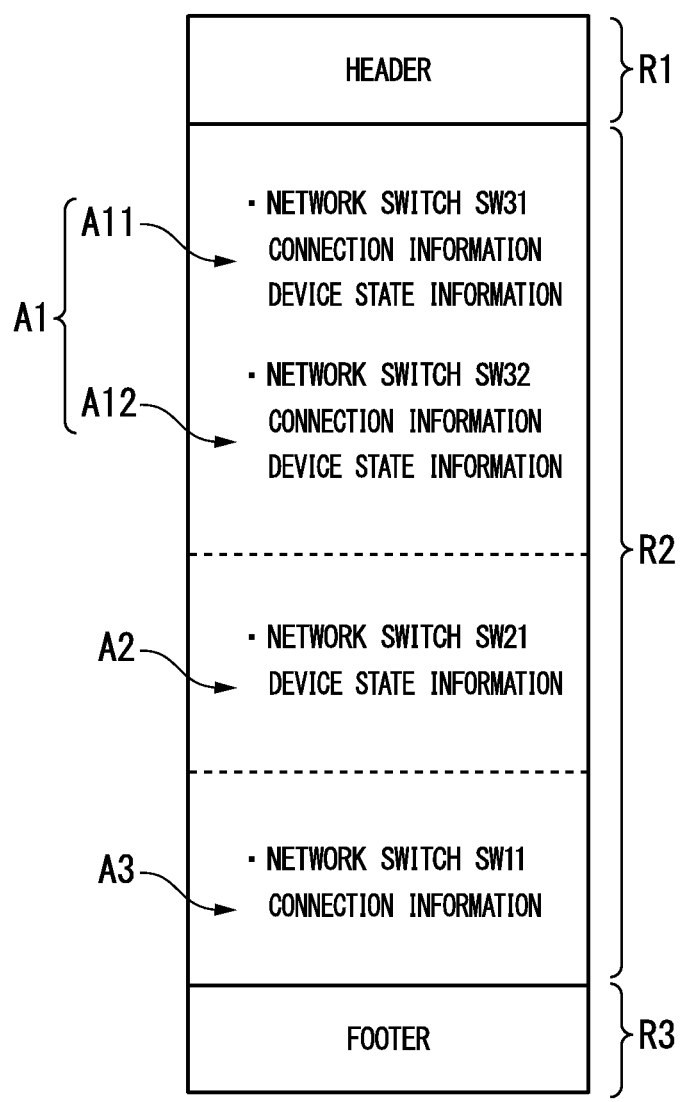
FIG. 3 is a diagram of one example of information transmitted from a network switch in accordance with the first preferred embodiment of the present invention.

FIG. 3 is one example of information transmitted from a network switch in accordance with the first preferred embodiment of the present invention. The information in FIG. 3 is transmitted from the communication unit 56 of the network switch SW21 to the device-managing apparatus 40. As shown in FIG. 3, the unit of this information is a frame including a header region R1, an information storage region R2, and a footer region R3.

In the header region R1, a destination address (the address of the device-managing apparatus 40), a source address (the address of the network switch SW21), the frame length, and such like are stored. In the information storage region R2, information A1 relating to the network switches SW31 and SW32 provided in the third layer L3 of the field network N1, information A2 relating to the network switch SW21, and information A3 relating to the network switch SW11 provided in the first layer L1 of the field network N1 are stored.

Specifically, the information A1 contains information A11 including connection information and device state information acquired from the network switch SW31, and information A12 including connection information and device state information acquired from the network switch SW32. The information A2 is device state information, acquired as the detection result of the device state detector 52 provided in the network switch SW21. The information A3 is connection information, acquired as the detection result of the higher-level layer connecting detector 51a in the network switch SW21 (information indicating the connection state of the network switch SW21 and the network switch SW11).

In the footer region R3, a frame check sequence (FCS: error-control information) and the like is stored. In example shown in FIG. 3, the information transmitted from the network switch SW21 to the device-managing apparatus 40 is contained within a single frame. However, in cases such as when a large quantity of information is to be transmitted, the information transmitted to the device-managing apparatus 40 can be divided into a plurality of frames as necessary.

Configurations similar to those of the higher-level layer connecting detector 51a, the device state detector 52, the normalization unit 54, and the communication unit 56 of the network switch SW21 are also provided in the field devices 10 mentioned above (sensor devices 11 and valve devices 12). Configurations similar to those of the higher-level layer connecting detector 51a, the lower-level layer connecting detector 51b, the device state detector 52, the lower-level layer information collection unit 53, the normalization unit 54, the determination unit 55, and the communication unit 56 of the network switch SW21 are provided for each of the controllers in the controller group 20.

Figure 4:
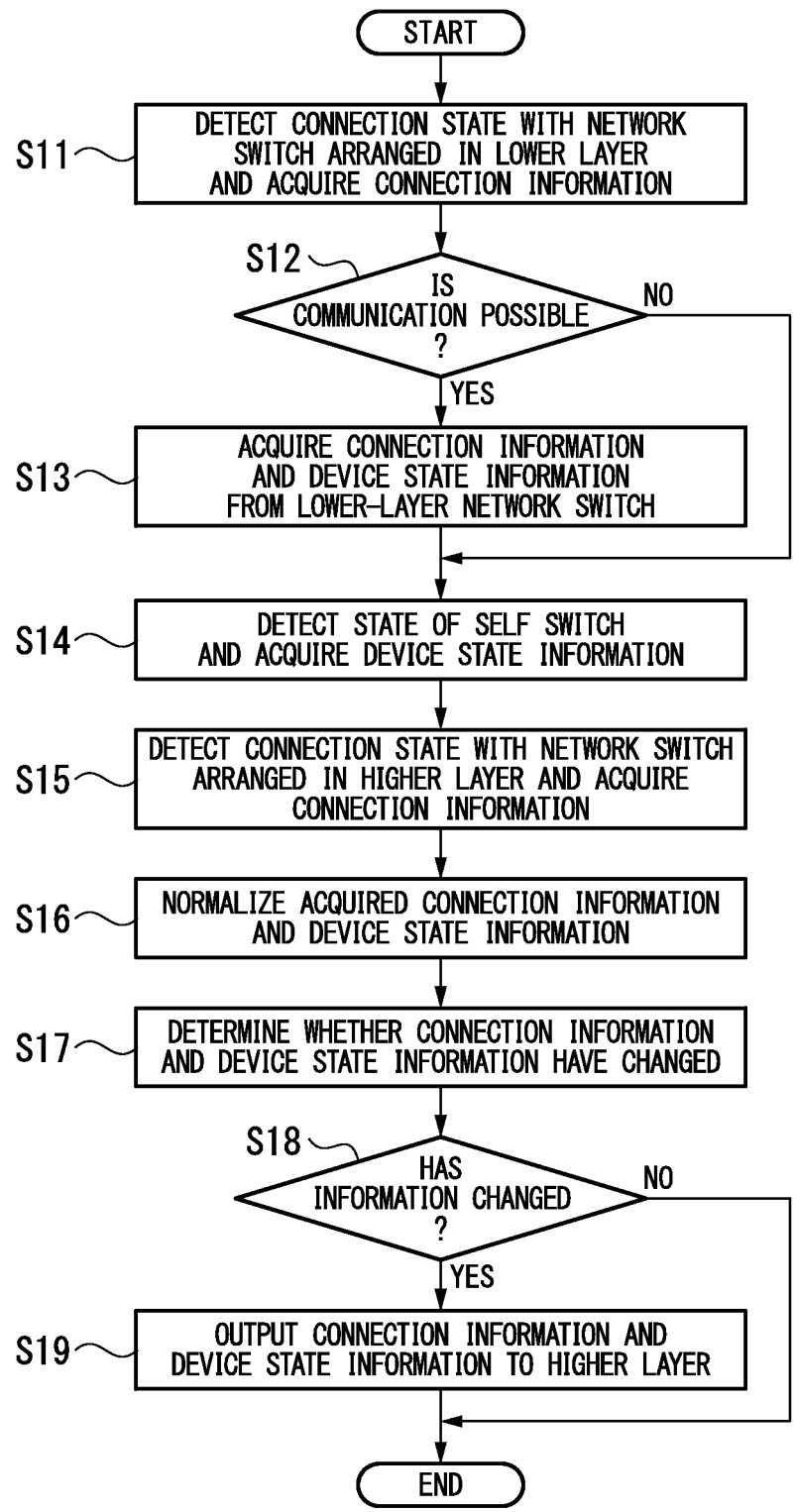
FIG. 4 is a flowchart of an operation of a network switch forming a process control system in accordance with the first preferred embodiment of the present invention.

Subsequently, an operation of the process control system having the configuration described above will be described. FIG. 4 is a flowchart of an operation of a network switch forming a process control system in accordance with the first preferred embodiment of the present invention. The network switches SW11, SW21, SW22, and SW31 to SW34 forming the field network N1 and the network switch SW0 forming the control network N2 all similarly perform the operation according to the flowchart of FIG. 4. For that reason, the following explanation takes as an example the operation of the network switch SW21 forming one part of the field network N1. The processes shown in FIG. 4 are, for example, executed in a fixed cycle.

When the processing of the flowchart in FIG. 4 starts, a process is performed to detect the connection state of the network switches arranged in the lower-level layer (network switches SW31 and SW32 arranged in the third layer L3) and acquire connection information (Step S11: first step). Specifically, the lower-level layer connecting detector 51b of the network switch SW21 diagnoses whether the cable used in connecting the network switches SW31 and SW32 has become disconnected, whether a link has been established between the network switches SW31 and SW32, and the like, and connection information in accordance with the result of this diagnosis is acquired.

Based on the connection information acquired in Step S11, the network switch SW21 determines whether communication is possible with the network switches arranged in the lower-level layer (network switches SW31 and SW32) (Step S12). If it is determined that communication is possible, the lower-level layer information collection unit 53 of the network switch SW21 performs a process of collecting connection information and device state information from the lower-level layer network switches (network switches SW31 and SW32). If it is determined in Step S12 that communication is not possible, the process of Step S13 is not performed.

A process is then performed to detect the state of the network switch SW21 and acquire device state information (Step S14: first step). Specifically, the device state detector 52 detects whether there is a malfunction in the components and modules provided inside the network switch SW21, the temperature of the components provided inside the network switch SW21, the temperature of the surrounding environment, the power voltage, and such like, and thereby acquires device state information.

The network switch SW21 then performs a process of detecting the connection state of the network switch (network switch SW11) arranged in the higher-level layer (first layer L1) and acquire connection information (Step S15: first step). Specifically, in like manner to Step S11, the higher-level layer connecting detector 51a of the network switch SW21 diagnoses whether the cable used in connecting the network switch SW11 has become disconnected, whether a link has been established with the network switch SW11, and the like, and connection information in accordance with the result of this diagnosis is acquired.

When the above processes end, the normalization unit 54 of the network switch SW21 performs a process of normalizing the connection information acquired in Steps S11 and S15, the device state information acquired in Step S14, and the connection information and the device state information acquired (collected) in Step S13 (Step S16). Specifically, for example, it performs a process of converting the connection information and the device state information such that their coding systems match a predetermined reference coding system.

When the process of normalizing the connection information and the device state information ends, the determination unit 55 determines whether the content of the connection information and device state information output from the normalization unit 54 has changed (Steps S17 and S18). Specifically, the determination unit 55 determines whether the connection information and the device state information have changed by comparing connection information and device state information stored in a memory (not shown) provided in the determination unit 55 with the connection information and device state information newly acquired from the normalization unit 54 (Step S18).

When at least one of the connection information and the device state information has changed, the determination result of Step S18 is YES, and the communication unit 56 of the network switch SW21 performs a process of outputting the changed connection information and device state information (the connection information and device state information newly acquired from the normalization unit 54) to the higher-level layer (Step S19: second step). Specifically, it performs a process of outputting the connection information and the device state information to the network switch SW11 above the second layer L2 where the network switch SW21 is arranged. In contrast, when the connection information and the device state information have not changed, the determination result of Step S18 is NO and the process of Step S19 is omitted.

Operations similar to the one described above are performed by the network switches SW11, SW21, SW22, and SW31 to SW34 forming the field network N1, by the network switch SW0 forming the control network N2, and by the field devices 10 and each controller forming the controller group 20. The connection information and the device state information acquired from these devices is thus sequentially transmitted to the higher-level layer, and is finally collected in the device-managing apparatus 40. Based on the connection information and the device state information that was collected, the device-managing apparatus 40 manages the process control system 1 (the field devices 10, the controller group 20, the field network N1, and the control network N2) (third step).

As described above, in the first preferred embodiment, the higher-level layer connecting detector 51a and the lower-level layer connecting detector 51b that detect the connection state with the network and acquire connection information, and the device state detector 52 that detects the state of the network switch itself and acquires device state information, are provided in each of the network switches SW11, SW21, SW22, and SW31 to SW34 forming the field network N1 and in the network switch SW0 forming the control network N2. Units similar to the higher-level layer connecting detector 51a, the lower-level layer connecting detector 51b, and the device state detector 52 are also provided in the field devices 10 connected to the field network N1 and in the controllers forming the controller group 20 connected to the field network N1 and the control network N2. Connection information and device state information acquired by these devices are sequentially transmitted to the higher-level layer side and collected by the device-managing apparatus 40. Therefore, the location and cause of failures can be identified easily, and the failures can be repaired in a short time.

Furthermore, the first preferred embodiment includes the normalization unit 54, which normalizes the connection information acquired by the higher-level layer connecting detector 51a and the lower-level layer connecting detector 51b, the device state information acquired by the device state detector 52, and the connection information and device state information collected by the lower-level layer information collection unit 53. Therefore, even if, for example, the field devices 10 connected to the field network N1 have non-uniform information coding systems or are supplied from different vendors, the connection information and device state information can be handled in the same way irrespective of the layer. This makes it possible to deal with a failure on a communication path by automatically switching to a predetermined auxiliary route etc.

By normalizing the connection information and the device state information, all information needed to restore the failure, such as the time when the failure occurred, the location, and the type of the failure (whether it is a device failure or a communication path failure, etc.), can be ascertained without omission. It is therefore possible, for example, to decide a countermeasure (whether to repair the device or to normalize the communication path etc.) before carrying out repair work, and it is possible to repair the failure in a short time.

Also, due to the normalization of the connection information and the device state information, the dictionary data (data needed to decipher information acquired from subordinate devices) provided in the operation-monitoring apparatus 30 and the device-managing apparatus 40 can be deleted, and the processing load of deciphering this information using the dictionary data can be reduced. Conventionally, it has been necessary to prepare dictionary data for all the devices under the control of the operation-monitoring apparatus 30 and the device-managing apparatus 40, and to switch the dictionary data while deciphering the information. In contrast, in the first preferred embodiment, since the connection information and the device state information are normalized, dictionary data need only be prepared for deciphering the device immediately below (network switch SW0), with no need to switch the dictionary data while deciphering the information.

The first preferred embodiment includes the determination unit 55 for determining whether the content of the connection information and the device state information output from the normalization unit 54 has changed; when it is determined that the content has not changed, the connection information and the device state information are not output, and when it is determined that they have changed, the connection information and the device state information are output. This makes it possible to avoid bloating of the amount of connection information and device state information output to the higher-level layer, to prevent inhibition of the real-time characteristic of the process control due to wasteful use of communication resources, and to collect the connection information and device state information efficiently.

Also, in the first preferred embodiment, since the connection information and the device state information are output when the determination unit 55 determines that the content of the connection information and the device state information output from the normalization unit 54 has changed, when network switches constituting the field network N1 and the control network N2 are added or deleted, information indicating the addition/deletion is instantly collected in the device-managing apparatus 40. Similarly, when adding or deleting the field devices 10 and the controllers forming the controller group 20 connected to the field network N1 and the control network N2, information indicating the addition/deletion is instantly collected in the device-managing apparatus 40.

The first preferred embodiment includes the higher-level layer connecting detector 51a and the lower-level layer connecting detector 51b, acquiring connection information of the network switch itself and network switches and the like arranged in a lower-level layer than the network switch itself, and also connection information of the network switch itself and network switches and the like arranged in a higher-level layer than the network switch itself. Therefore, even if a plurality of network switches and the like are arranged in the higher-level layer and directly connected to the network switch itself, as in a mesh topology commonly used in wireless networks and the like, the communication path of each can be ascertained. By, for example, switching the communication paths as necessary, it is possible to level the network load and realize an avoidance route for use when an abnormality occurs.

The field network N1 and the control network N2 of the first preferred embodiment can be configured in a redundant arrangement. In such a configuration, when, for example, the connection information acquired as the detection result of the higher-level layer connecting detector 51a of the network switch SW21 (information indicating the connection state of the network switch SW21 and the network switch SW11) is abnormal, the connection information and the device state information can be output to the network switch SW11 via another route of the redundant field network N1.

Alternatively, when, for example, the network switch SW21 in the lower-level layer has detected a change (abnormality) in the network switch SW11 in the higher-level layer, it can avoid the network switch SW11 where the abnormality was detected, and output the connection information and the device state information to another upper device.

In the first preferred embodiment, the location of a failure can be identified by using the layer unit of the field network N1 or the connecting unit among the network switches and the like. This makes it possible to cut off the area where the failure has occurred without stopping the overall operation of the process control system 1, thereby minimizing the effect on the operation of the process control system 1.

Second Preferred Embodiment

Subsequently, a process control system and a managing method therefor in accordance with a second preferred embodiment of the present invention will be described. As shown in FIG. 3, in the first preferred embodiment described above, information was sequentially transmitted to the higher-level layer side in a frame format containing connection information and device state information. In contrast, in the second preferred embodiment, information is sequentially transmitted to the higher-level layer side in a frame format containing flag information indicating the present soundness appended to data used in process control (e.g. measurement data from the sensor device 11), thereby enabling other network switches and the like arranged on the higher-level layer side to ascertain the reliability of that information in real time.

Figure 5:
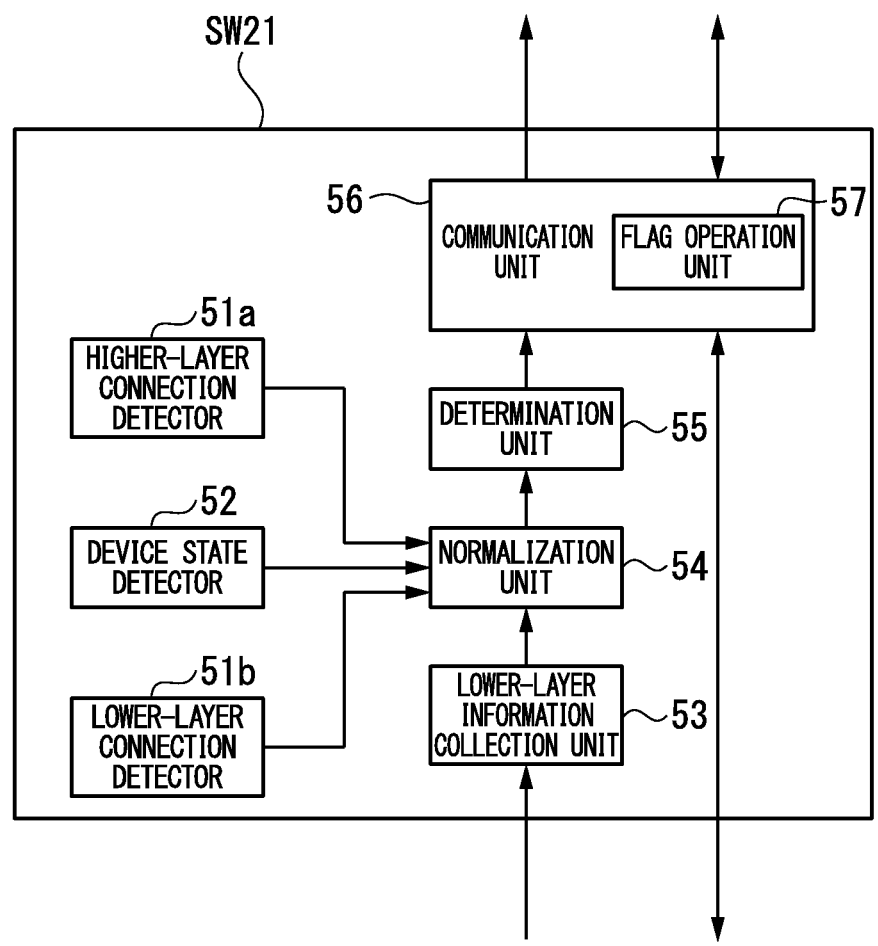
FIG. 5 is a block diagram of the configuration of primary parts of a network switch provided in a process control system in accordance with the first preferred embodiment of the present invention.

While the overall configuration of the process control system of the second preferred embodiment is similar to that of the process control system 1 shown in FIG. 1, the internal configuration of the network switches and the like provided within the process control system are slightly different from those shown in FIG. 2. FIG. 5 is a block diagram of the configuration of primary parts of a network switch provided in a process control system in accordance with the first preferred embodiment of the present invention. As above, in the second preferred embodiment, since the network switches SW0, SW11, SW21, SW22, and SW31 to SW34 have similar configurations, the network switch SW21 forming one part of the field network N1 will be taken as representative and described.

As shown in FIG. 5, the network switch SW21 provided in the process control system of the second preferred embodiment includes a flag operation unit 57 inside the communication unit 56. The flag operation unit 57 appends flag information to data output from the network switches arranged in the lower-level layer. When the flag information has already been appended to the connection information and the device state information from the determination unit 55, the flag operation unit 57 performs a determination of the flag information.

Values indicating, for example, 'normal', 'abnormal', and 'undetermined' can be used as the flag information. 'Normal' indicates that the content of the connection information and device state information is sound, 'abnormal' indicates that the content is unsound, and 'undetermined' indicates that it is unclear whether the content is sound or unsound.

Figure 6:
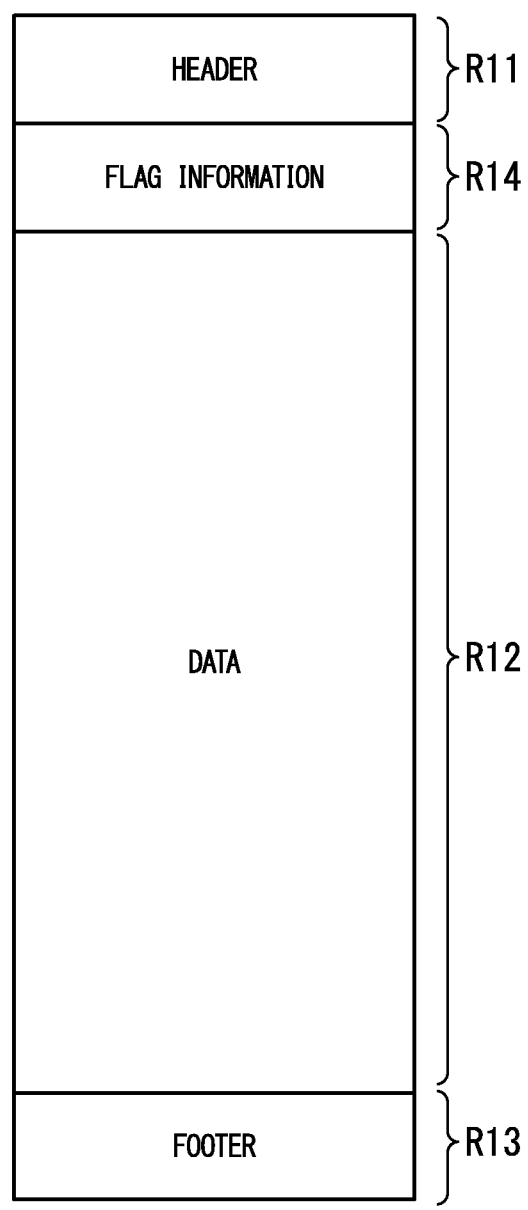
FIG. 6 is a diagram of one example of information transmitted from a network switch in accordance with the second preferred embodiment of the present invention.

FIG. 6 is a diagram of one example of information transmitted from a network switch in accordance with the second preferred embodiment of the present invention. The information shown in FIG. 6 is transmitted from the communication unit 56 of the network switch SW21 to the device-managing apparatus 40. As shown in FIG. 6, the unit of this information is a frame including, in addition to a header region R11, a data storage region R12, and a footer region R13, a flag information storage region R14 for storing the flag information. The data storage region R12 is for storing data output from network switches arranged in the lower-level layer. In the example of FIG. 6, the flag information storage region R14 is provided between the header region R11 and the data storage region R12.

Figure 7:
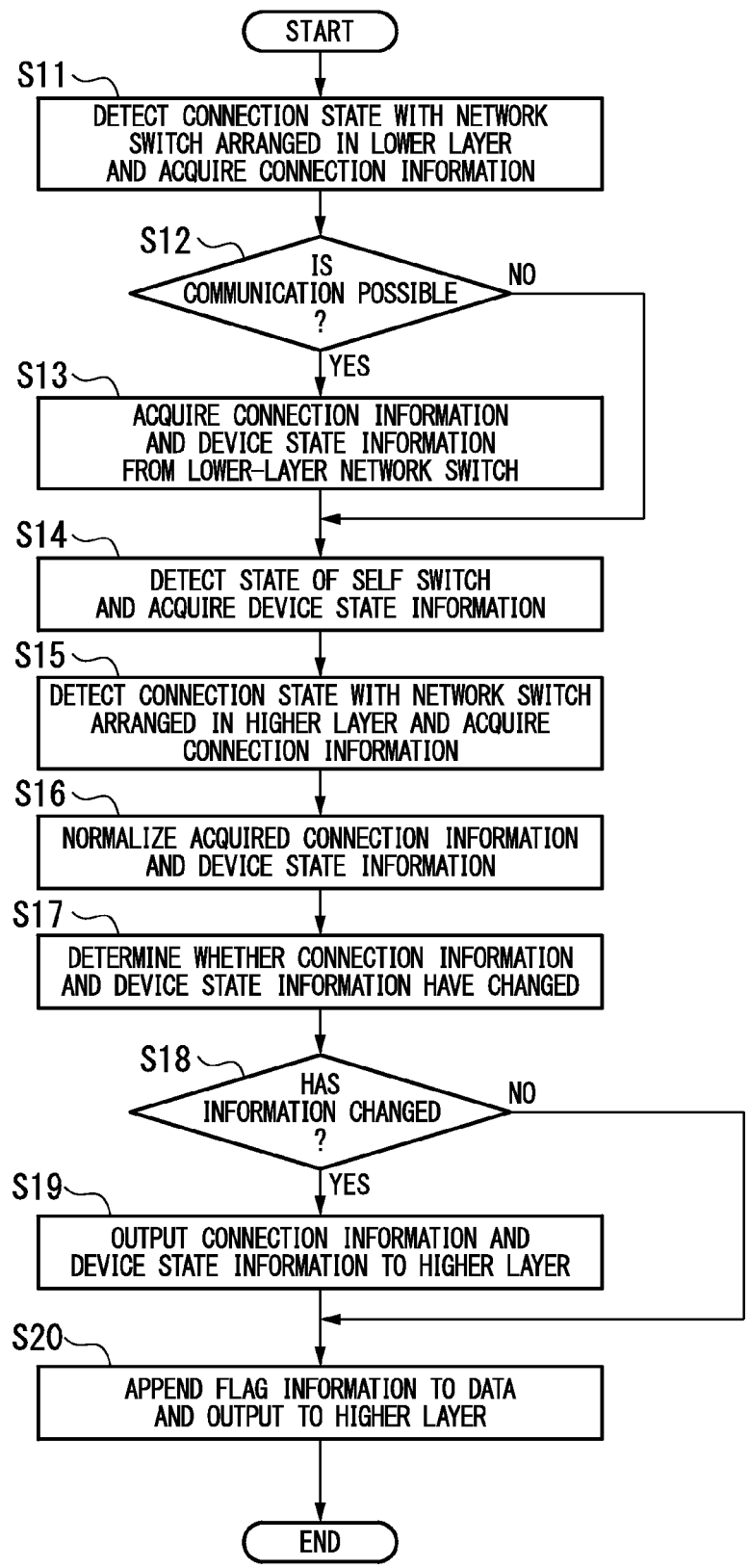
FIG. 7 a flowchart of an operation of a network switch forming a process control system in accordance with the second preferred embodiment of the present invention.

Subsequently, an operation of the process control system having the above configuration will be described. FIG. 7 is a flowchart of an operation of a network switch forming a process control system in accordance with the second preferred embodiment of the present invention. As in the first preferred embodiment, the following explanation takes as an example the operation of the network switch SW21 forming one part of the field network N1. The processes shown in FIG. 7 are, for example, executed in a fixed cycle.

When the processing of the flowchart in FIG. 7 starts, as in the first preferred embodiment, processes are performed sequentially from a process of detecting the connection state of the network switches arranged in the lower-level layer (the network switches SW31 and SW32 arranged in the third layer L3) and acquiring connection information (Step S11) to a process of normalizing the connection information and the device state information (Step S16). A process is then performed to determine whether the content of the normalized connection information and device state information has changed (Steps S17 and S18).

When it is determined in Step S18 that at least one of the connection information and the device state information has changed (where the determination result is YES), the communication unit 56 of the network switch SW21 performs a process of outputting the changed connection information and device state information (that were newly acquired from the normalization unit 54) to the higher-level layer (Step S19). The flag operation unit 57 then performs a process of appending flag information to the data output from the network switches arranged in the lower-level layer (network switches SW31 and SW32), and the communication unit 56 of the network switch SW21 performs a process of outputting the data with the flag information appended thereto to the higher-level layer (Step S20). The process of step S20 can be performed before the process of Step S18.

On the other hand, when it is determined in Step S18 that the connection information and the device state information have not changed (where the determination result is NO), the process of Step S19 is omitted and the process of Step S20 is performed. That is, flag information is appended to the data output from the network switches arranged in the lower-level layer (network switches SW31 and SW32), and the data with the flag information appended thereto is output to the higher-level layer.

As described above, in the second preferred embodiment, information in a frame format including, in addition to the connection information and the device state information, flag information indicating the present soundness is sequentially transmitted to the higher-level layer side. Other network switches and the like arranged on the higher-level layer side can thus ascertain the reliability of that information in real time. In the second preferred embodiment, as in the first preferred embodiment, connection information and device state information acquired from the devices is sequentially transmitted to the higher-level layer side and collected by the device-managing apparatus 40. Therefore, the location and cause of failures can be identified easily, and the failures can be repaired in a short time.

While in the description of the second preferred embodiment, the flag operation unit 57 appends flags to data transmitted to the higher-level layer, it can also append flags to data transmitted to the lower-level layer. When appending flags to data transmitted to the lower-level layer, if, for example, a field device receives data with a flag other than 'normal' appended thereto, it destroys that data so as not to perform an abnormal operation.

Third Preferred Embodiment

Figure 8:
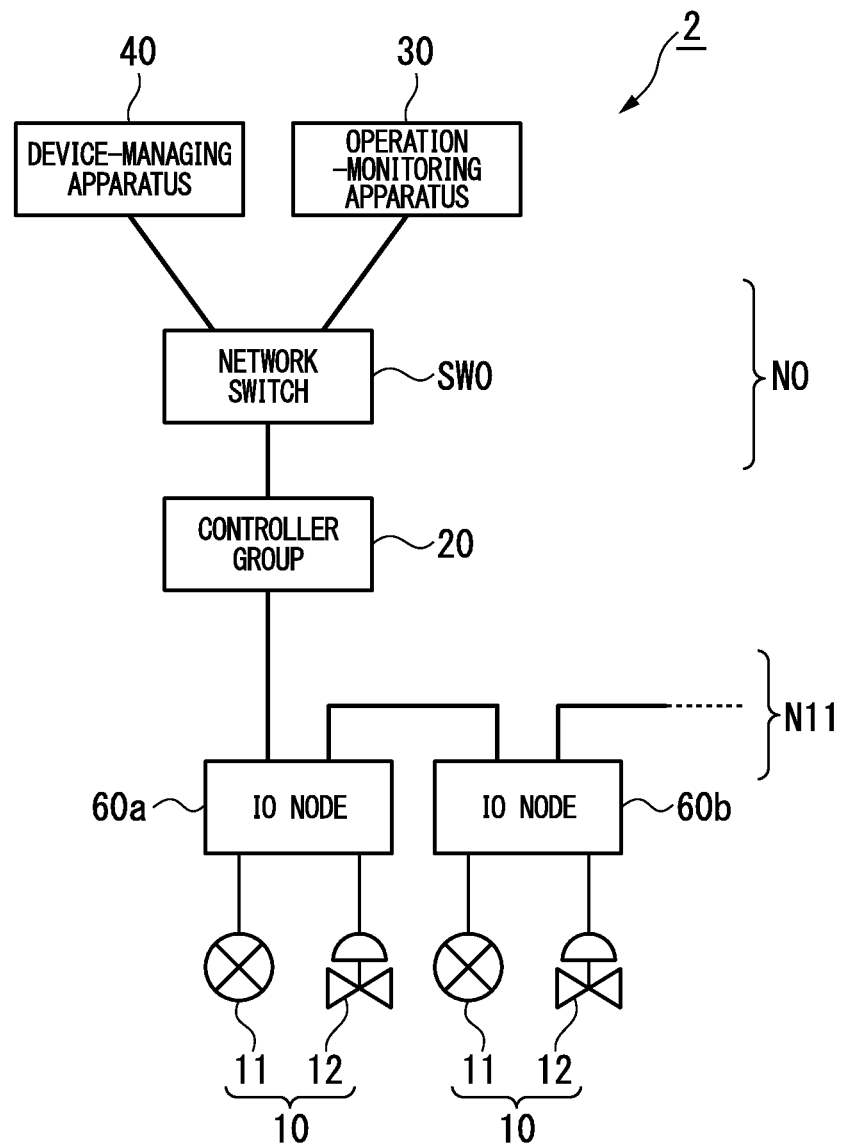
FIG. 8 is a block diagram of the overall configuration of a process control system in accordance with a third preferred embodiment of the present invention.

FIG. 8 is a block diagram of the overall configuration of a process control system in accordance with a third preferred embodiment of the present invention. The field network N1 provided in the process control system 1 of the first and second preferred embodiments was configured by connecting the plurality of network switches SW11, SW21, SW22, and SW31 to SW34 in a tree-type cascade. In contrast, a field network N1 of the third preferred embodiment is configured by connecting IO nodes 60a, 60b, . . . (network devices) in a line-type cascade.

The IO nodes 60a, 60b, . . . are devices for inputting and outputting various types of information to and from the field devices 10. The IO nodes 60a, 60b, . . . each include a repeater function, and are connected to the field network N1 in a line-type cascade. The IO nodes 60a, 60b, . . . have a configuration similar to that of the higher-level layer connecting detector 51a, the lower-level layer connecting detector 51b, the device state detector 52, the lower-level layer information collection unit 53, the normalization unit 54, the determination unit 55, and the communication unit 56 of the network switches SW11, SW21, SW22, and SW31 to SW34 shown in FIG. 1. Thus in the third preferred embodiment, as in the first preferred embodiment, connection information and device state information acquired from the devices (nodes) are sequentially transmitted to the higher-level layer side and collected by the device-managing apparatus 40. Therefore, the location and cause of failures can be identified easily, and the failures can be repaired in a short time.

While a process control system and a managing method therefor according to preferred embodiments of the present invention have been described above, the present invention is not limited to these preferred embodiments and can be freely modified within the scope of the present invention. For example, in the preferred embodiments described above, each network switch includes the higher-level layer connecting detector 51a, the lower-level layer connecting detector 51b, and the device state detector 52, and outputs the detection results of the higher-level layer connecting detector 51a and the lower-level layer connecting detector 51b as connection information; in addition, the network switch outputs the detection result of the device state detector 52 as device state information. However, it is acceptable if each network switch includes only one of the higher-level layer connecting detector 51a and the lower-level layer connecting detector 51b, and outputs one of the connection information and the device state information.

While in the preferred embodiments described above, the device-managing apparatus 40 is connected to the control network N2, it can be connected to the field network N1 or to an external network other than the field network N1 and the control network N2. The device-managing apparatus 40 can be provided to the operation-monitoring apparatus 30 and to the controllers forming the controller group 20. That is, the device-managing apparatus 40 can be arranged in the uppermost layer of the device being monitored.

In the preferred embodiments described above, it is determined whether communication is possible with the network switches arranged in the lower-level layer, and if so, connection information and device state information from the network switches arranged in the lower level are collected in the lower-level layer information collection unit 53. However, irrespective of whether communication is possible with the network switches arranged in the lower-level layer, when communication with the network switches arranged in the higher-level layer is impossible, the network switches arranged in the lower-level layer can be commanded to perform a predetermined emergency interim operation (e.g. a holding operation of continuing a given operation). This can prevent an abnormal operation from being performed during an emergency.

In addition to the network switches described in the first and second preferred embodiments, the network devices provided in the process control system of this invention can be hubs, switches, routers, linking devices, gateways, access points, etc. Furthermore, in addition to the IO nodes described in the third preferred embodiment, the devices having the function of the network devices described above can be controllers, device-managing apparatuses, operation-monitoring apparatuses, etc.

As used herein, the following directional terms "forward, rearward, above, downward, right, left, vertical, horizontal, below, transverse, row and column" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, unit or part of a device includes hardware and software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A process control system for controlling an industrial process, comprising:
    a first field device configured to generate a first field device state information in a first code system, the first field device state information indicating at least one of an abnormality and a malfunction of the first field device;
    a second field device configured to generate a second field device state information in a second code system, the second field device state information indicating at least one of an abnormality and a malfunction of the second field device, the second code system being different from the first code system;
    a plurality of network devices connected with the network and including at least a first network device and a second network device, the first network device being configured to receive the first field device state information in the first code system and convert the first field device state information in the first code system into a first field device state information in a uniform code system, and the second network device being configured to receive the second field device state information in the second code system and convert the second field device state information in the second code system into a second field device state information in the uniform code system;
    a controller connected with a network and communicating with the plurality of network devices, the controller being configured to receive the first field device state information in the uniform code system from the first network device and the second field device state information in the uniform code system from the second network device; and
    a higher-level managing apparatus connected higher in level of the network than the controller and configured to receive, from the controller, the first field device state information in the uniform code system and the second field device state information in the uniform code system, the higher-level managing apparatus configured to decipher, using a uniform dictionary for the uniform code system, the first field device state information in the uniform code system and the second field device state information in the uniform code system.

2. The process control system according to claim 1, wherein the first network device comprises:
    a first connection state detector configured to detect a first network device connection state of the first network device with the network; and
    a first device state detector configured to detect a first network device state of the first network device; and
    wherein the second network device comprises:
    a second connection state detector configured to detect a second network device connection state of the second network device with the network; and
    a second device state detector configured to detect a second network device state of the second network device.

3. The process control system according to claim 2, wherein
    the controller is configured to receive the first network device connection state and the first network device state of the first network device from the first network device, and the second network device connection state and the second network device state of the second network device from the second network device, and
    the higher-level managing apparatus is configured to receive, from the controller, the first network device connection state and the first network device state of the first network device, and the second network device connection state and the second network device state of the second network device.

4. The process control system according to claim 3, wherein the higher-level managing apparatus comprises:
    an operation-monitoring apparatus configured to receive the first field device state information in the uniform code system, the second field device state information in the uniform code system, the first network device connection state, the second network device connection state, the first network device state, and the second network device state, for supervising the controller to control the first and second field devices; and a device-managing apparatus configured to receive the first field device state information in the uniform code system, the second field device state information in the uniform code system, the first network device connection state, the second network device connection state, the first network device state, and the second network device state, for managing the first and second field devices, the controller, and the network.

5. The process control system according to claim 4, wherein the plurality of network devices further comprises a third network device connected with the first and second network devices, wherein the first network device is connected with the first field device, wherein the second network device is connected with the second field device, wherein the third network device is configured to receive the first field device state information in the uniform code system from the first network device, and the second field device state information in the uniform code system from the second network device, and wherein the controller is configured to receive, from the third network device, the first field device state information in the uniform code system and the second field device state information in the uniform code system.

* * * * *